April 3, 1962   J. M. RIEBE ETAL   3,028,122
LANDING ARRANGEMENT FOR AERIAL VEHICLES
Filed May 2, 1960   2 Sheets-Sheet 1

INVENTORS
JOHN M. RIEBE
VERNARD E. LOCKWOOD
BY
ATTORNEYS

April 3, 1962  J. M. RIEBE ETAL  3,028,122
LANDING ARRANGEMENT FOR AERIAL VEHICLES
Filed May 2, 1960 2 Sheets-Sheet 2
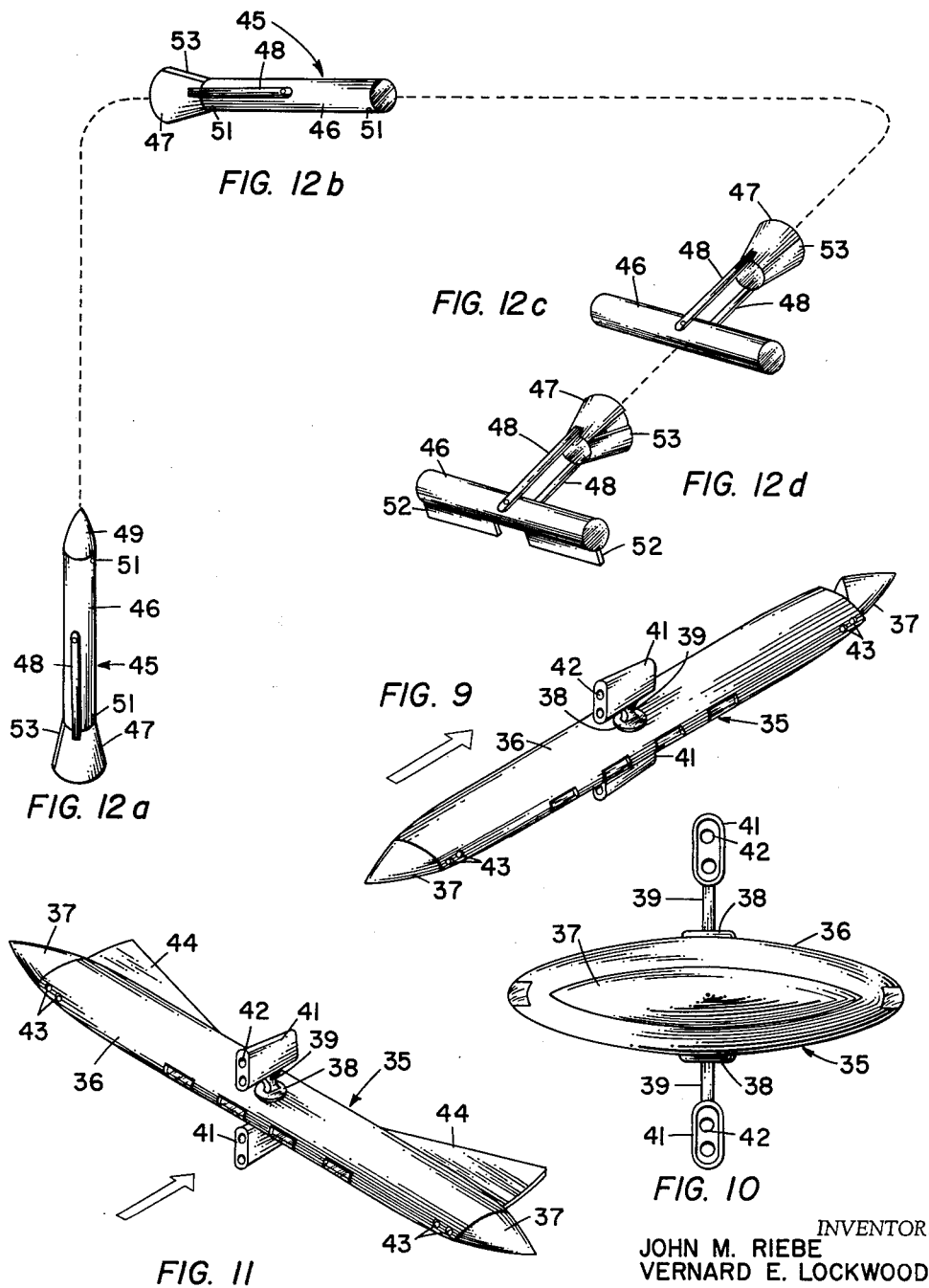
INVENTORS
JOHN M. RIEBE
VERNARD E. LOCKWOOD
BY
ATTORNEYS cle configuration in a low aspect ratio flight attitude;

United States Patent Office 3,028,122
Patented Apr. 3, 1962

3,028,122
LANDING ARRANGEMENT FOR AERIAL VEHICLES

John M. Riebe, Newport News, and Vernard E. Lockwood, Hampton, Va., assignors to the United States of America as represented by the Administrator of the National Aeronautics and Space Administration
Filed May 2, 1960, Ser. No. 26,375
6 Claims. (Cl. 244—46)
(Granted under Title 35, U.S. Code (1952), sec. 266)

The invention described herein may be manufactured and used by or for the Government of the United States of America for governmental purposes without the payment of any royalties thereon or therefor.

This invention relates generally to aerial vehicles and spacecraft capable of very high speed flight within and above the earth's atmosphere and also having low speed flight capabilities for takeoff from and landing upon presently existing airfields.

The speed capabilities of aircraft have rapidly advanced in recent years as a result of increased knowledge and experience in the fields of aerodynamics and propulsion. The speed of missiles and rockets has increased enormously with the evolution of massive and highly efficient powerplants, and now vehicles capable of escape velocity and ultimate operation in deep space are being designed and fabricated. Such of these vehicles that must be operated within the earth's atmosphere, however, as in takeoff and landing, have heretofore been designed to comply with the requirements of high speed aerodynamics, which are generally incompatible with the characteristics of configurations designed for low speed takeoff and landing. Some of the approaches taken in recent years to overcome this apparent design incompatibility have tended to be somewhat evasive of the problem rather than soluble thereof. It is a matter of common knowledge, for example, that most present day upper altitude, very high speed, research aircraft generally descend at a very rapid rate and land at a speed of several hundreds of miles per hour, making it necessary to confine operations of these aircraft to the vicinity of an extremely large, flat, cleared area, such as a dry, salt lake bed, on which the aircraft may touch down and skid to a stop. Another problem area has been found in the recovery of orbital packages reentering the earth's atmosphere. The speed of these packages is so high that impact with the ground would very probably result in total destruction of the package and its contents. One expedient proposed and attempted, without success as of the filing date of this application, to recover these packages is to cover the calculated reentry area with a pattern of fast aircraft each provided with equipment with which to catch the package in midair and draw it into the recovery aircraft. This is an obviously haphazard and expensive procedure; apparently justifiable solely on the basis that a better way of obtaining the desired result is presently unavailable. In the landing of transonic and low supersonic aircraft drogue parachutes have been used with some degree of success in reducing velocity after contact of the aircraft with the ground. In some instances, also, parachutes have been used for missile and rocket booster vehicle recovery; such missiles usually being arranged for nose downward, parachute retarded descent, and being provided with a long nose spike designed to penetrate the ground upon impact for gradual shock application, while booster vehicles are usually not provided with even this simple device. Present day parachutes, however, do not always operate satisfactorily at supersonic speeds, due to improper ventilation and a tendency to pulsate. Further, parachute recovery of missiles or booster rocket vehicles is generally difficult to control; the landing point being confined only to a generally large area, which may result in the expenditure of a great amount of time and effort in locating the missile or vehicle and bringing it in over rough terrain. The present invention is the result of a positive approach to resolve the design difficulties hereinbefore noted, and establishes an aerodynamic configuration for an aerial or space vehicle having a planform variable in flight between a low aspect ratio attitude for high speed flight and a high aspect ratio attitude with high aerodynamic lift and low drag for low speed takeoff or landing of such vehicles. This invention is further directed to the provision of means for increasing the aerodynamic lift of the vehicle when positioned in such high aspect ratio attitude.

Accordingly, it is an object of the present invention to provide an aerial or space vehicle configuration positionable in a low aspect ratio attitude for high speed flight.

Another object of the instant invention is the provision of an aerial vehicle or spacecraft configuration positionable in a high aspect ratio attitude for low speed flight, takeoff, or landing.

A still further object of the present invention is the provision of a new and improved variable planform configuration for aerial or space vehicles characterized by large in flight aspect ratio variation capabilities.

Another still further object of the instant invention is the provision of a new and improved variable planform configuration for aerial vehicles and spacecraft characterized by large in flight aspect ratio variation capabilities, and further characterized by aerodynamic lift capabilities exceeding the increase in lift obtainable by increasing the aspect ratio thereof.

According to the present invention, the foregoing and other objects are attained by providing an aerial vehicle capable of powered movement through the atmosphere with at least an elongated fuselage or hull section; jet means for yawing the fuselage section while in flight between a low aspect ratio position substantially in alignment with the direction of movement of the vehicle and a high aspect ratio position substantially transverse to the direction of the vehicle, and also means operable to increase aerodynamic lift generated by the vehicle when the fuselage or hull section thereof is positioned substantially transverse to the direction of movement of the vehicle through the atmosphere.

A more complete appreciation of the invention and many of the attendant advantages thereof will be readily apparent as the same becomes better understood by reference to the following detailed description when considered in connection with the accompanying drawings wherein:

FIG. 9 is an isometric view of an aerial or space vehi-

FIG. 10 is a front elevational view of the vehicle of FIG. 9 in the attitude shown therein;

FIG. 11 is an isometric view of the vehicle of FIG. 9 in a high aspect ratio flight attitude; and FIGS. 12a–12d illustrate the sequence of events in a launching, orbiting, reentry, and glide landing of a cylindrical satellite or a booster vehicle having an inflight variable aspect ratio fuselage portion provided with lift augmentation means.

Figure 1:
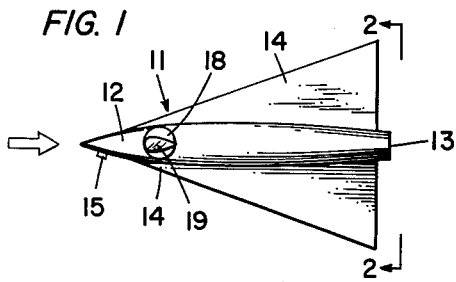
FIG. 1 is a plan view of a high speed aircraft configuration in a low aspect ratio flight attitude.
Figure 2:
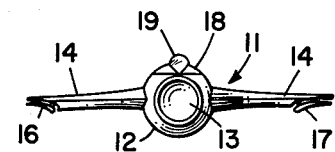
FIG. 2 is an elevational view of the aircraft of FIG. 1 taken along the line 2—2 of FIG. 1.
Figure 3:
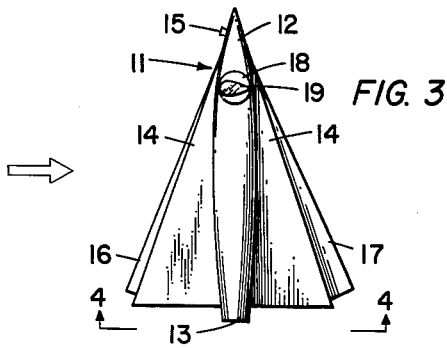
FIG. 3 is a plan view of the high speed aircraft configuration of FIG. 1 in a high aspect ratio flight attitude.
Figure 4:
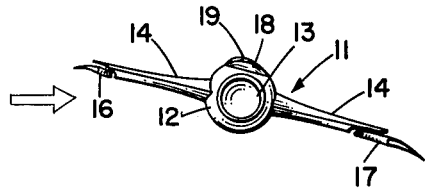
FIG. 4 is an elevational view of the aircraft of FIG. 3 taken along the line 4—4 of FIG. 3.

Referring now more particularly to the drawings, wherein like reference numerals designate identical parts throughout the several views, and more particularly to FIGS. 1 and 2, there is shown a very high speed aircraft, generally designated by the reference numeral 11. Aircraft 11 is provided with a conventional fuselage 12 of the type having a reaction motor mounted therein; the exhaust nozzle 13 of the motor being positioned at the after end of fuselage 12 in longitudinal alignment therewith. Fuselage 12 is provided with stubby highly swept wings 14 extending along the greater part of the length of fuselage 12 with the trailing edges thereof positioned closely adjacent the after end of fuselage 12, and along with fuselage 12 defining an aircraft delta planform. Fuselage 12 is also provided with a yaw control jet device having a nozzle 15 located near the forward end thereof a substantial distance from the center of gravity of aircraft 11. Nozzle 15 is arranged to direct a jet blast transversely with respect to the longitudinal centerline of aircraft 11 in substantially the same horizontal plane occupied by the airplane center of gravity and operable to induce a yawing moment about the aircraft center of gravity to change the heading of the aircraft with respect to the direction of movement thereof. Each of the wings 14 is also provided with a movable flap positioned along the leading or outboard edge thereof, one of these flaps, designated by the reference numeral 16, being smaller in area than the other flap, designated by the reference numeral 17. Each of the flaps 16 and 17 in plan view take the form of long thin wedges; the length thereof being substantially equal, and the maximum breadth of flap 16 being about half the maximum breadth of flap 17. Each flap is normally positioned in a conforming recess provided on the under surface of each wing 14 for high speed flight, with the broadest portion of each flap positioned adjacent the wing trailing edge and the outboard edge of each flap being positioned substantially adjacent the wing leading or outboard edge. The forward end of each flap is pivotally connected to the structure of the corresponding wing 14, and suitable means, not shown, are provided for moving the after end of each flap outwardly and somewhat downwardly from the position shown in FIG. 2 to the position shown in FIGS. 3 and 4. A pilot's compartment 18, surmounted by a suitable canopy 19, is also provided in fuselage 12. Compartment 18 is constructed as a cylindrical unit capable of being rotated through at least a ninety degree angle; the pilot's controls and the like being interconnected by means of flexible, electromechanical linkages to the aircraft control surfaces and the like. Aircraft 11 is also provided with suitable landing gear, not shown, comprising, by way of example, tandemly mounted main wheels retractable into fuselage 12 and outrigger wheels retractable into wings 14; each of these wheels being rotatable through a ninety degree angle. Suitable conventional means such as directional jets, control surfaces, or the like, not shown, are also provided in aircraft 11 for assuring adequate roll and yaw control thereof when aircraft 11 is positioned in the high aspect ratio attitude as illustrated in FIG. 3.

A typical flight mission of aircraft 11 will ordinarily commence with the aircraft positioned for takeoff with the pilot's compartment facing toward the nose of fuselage 12, flaps 16 and 17 in their retracted position, and the landing gear wheels disposed to permit aircraft 11 to move in the direction toward which the nose of fuselage 12 is pointed. Since the wings 14 in this attitude will generate very little aerodynamic lift, it is generally necessary to provide increased thrust during takeoff of aircraft 11 to prevent an excessively long takeoff run, which may be accomplished by providing the reaction motor propulsion means mounted in fuselage 12 with conventional afterburner means which may be utilized until the craft is airborne, and also by providing aircraft 11 with auxiliary solid fuel rocket motors or JATO units, not shown, which may be externally connected to the aircraft 11 and ignited during the takeoff run to increase thrust, and then jettisoned when aircraft 11 is airborne. Thereafter, in normal flight, aircraft 11 is held in this attitude with the nose of fuselage 12 directed into the relative wind, as indicated by the arrow in FIG. 1. Upon the completion of the normal flight mission, aircraft 11 is headed toward its landing area and at a preselected altitude and distance from the landing area, the pilot shuts off the motor in fuselage 12 and then operates the yaw control jet at nozzle 15 to swing fuselage 12 to a position athwart the relative wind, as indicated by the direction of the arrow of FIGS. 3 and 4. Simultaneously with this yawing of aircraft 11, the pilot may also rotate the pilot's compartment 18 in the direction opposite the direction of yaw in order that he may continuously face toward the direction of travel of the aircraft, and the landing gear wheels may also be rotated and lined up in accordance therewith. The pilot then may extend the flaps 16 and 17 to the position shown in FIGS. 3 and 4, with flap 16 upstream and flap 17 downstream with respect to the relative wind. In this attitude, the high aspect ratio of the yawed fuselage and the extended position of the flaps generates very high aerodynamic lift, and aircraft 11 is capable of glide landing at fairly low speed, obviating the necessity of providing a large landing area.

It is also contemplated that aircraft 11 be positioned for takeoff in the high aspect ratio attitude hereinbefore described in which landing of aircraft 11 is accomplished. In order to utilize the reaction motor mounted within fuselage 12 for takeoff in this attitude, a slot, not shown, is provided in a wing 14 adjacent the flap 17, and suitable means are also provided for selectively diverting the exhaust gases discharged by this reaction motor from exhaust nozzle 13 to this slot. The slot is positioned to direct the flow of exhaust gases therefrom over the upper surface of flap 17, when extended, in a rearwardly and somewhat downwardly direction. In this attitude, aircraft 11 may take off after a fairly short run without the assistance of auxiliary thrust generating means. A second nozzle 15, not shown, is also provided for the jet yaw control device. The second nozzle 15 is mounted to provide thrust in the direction opposite to that provided by the first nozzle 15, and is selectively operable to yaw aircraft 11 from its high aspect ratio takeoff attitude to the hereinbefore described normal low aspect ratio, high speed flight attitude.

Figure 5:
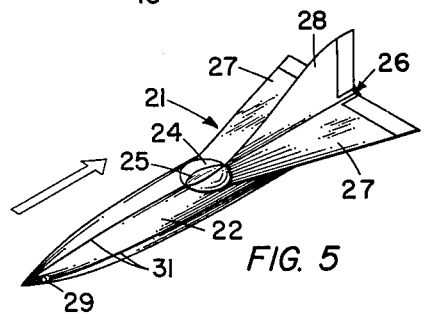
FIG. 5 is an isometric view of a modified form of a high speed aircraft in a low aspect ratio flight attitude.
Figure 6:
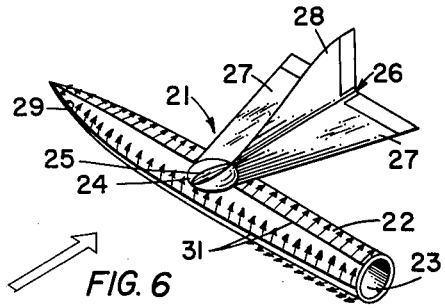
FIG. 6 is an isometric view of the aircraft of FIG. 5 in a high aspect ratio flight attitude.
Figure 7:
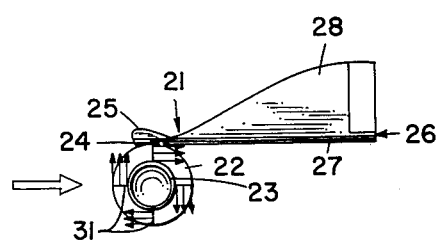
FIG. 7 is a side elevational view of the aircraft of FIG. 6 in the attitude shown therein.

A modified form of a high speed aircraft, generally designated by the reference numeral 21, is shown in FIGS. 5–7. Aircraft 21 includes a fuselage 22, similar to the fuselage 12 of aircraft 11, and likewise having a main reaction motor exhaust nozzle 23 at the after end thereof. Fuselage 22 is also provided with a rotatable pilot's compartment 24, surmounted by a suitable canopy 25, similar to compartment 18 and canopy 19 of aircraft 11. A delta horizontal stabilizer and vertical stabilizer assembly 26 is positioned adjacent the upper surface of fuselage 22 and extends from the pilot's compartment 24 toward the after end of fuselage 22. Assembly 26 includes a pair of highly swept horizontal stabilizers 27 capable of generating aerodynamic lift and a vertical stabilizer 28 connected thereto and centrally upwardly projecting therefrom to form a substantially unitary construction. The trailing edges of stabilizers 27 and stabilizer 28 may be provided with conventional control devices. The forward end of the stabilizers 28 are rigidly interconnected with the rotatable pilot's compartment 24, and no part of assembly 26 is connected to the fuselage 22 proper; the lower surface of assembly 26 merely overlying fuselage 22 in the attitude shown in FIG. 5. Fuselage 22 is also provided with a yaw control jet device having a nozzle 29 located near the forward end thereof similar to the first nozzle 15 in fuselage 12; the location of nozzle 29 in fuselage 22 being substantially similar to the location of first nozzle 15 in fuselage 12, and operable in similar manner to yaw fuselage 22 of aircraft 21 while in flight.

Fuselage 22 is also provided with a plurality of radially spaced slots 31 extending substantially from the nose to the after end thereof. Air or a like gas is blown from a source within fuselage 22 through these slots along the lengths thereof; the configuration of the slots being such that the gas is directed substantially tangentially to the surface of the fuselage at the location of the slots, as will be more fully explained hereinafter. The aircraft 21 is also provided with rotatable landing gear, not shown, of the type hereinbefore proposed for use with aircraft 11. Pilot's compartment 24 is rotatable similarly to compartment 18, and the pilot's controls and the like are likewise interconnected with the control devices and the like of aircraft 21 by means of flexible, electro-mechanical linkages.

A typical flight operation of aircraft 21 is similar to that of aircraft 11. In FIG. 5 aircraft 21 is positioned for takeoff and high speed flight with its nose headed into the relative wind, indicated by the direction of the arrow. Thrust augmentation means similar to those proposed for aircraft 11 are provided to enable aircraft 21 to take off in this low aspect ratio attitude on a relatively short runway. Upon completion of the flight mission, aircraft 21 is headed toward its landing area and at a preselected altitude and distance from the landing area, the pilot shuts off the motor in fuselage 22 and then operates the yaw control jet at nozzle 29 to swing fuselage 22 to a position athwart the relative wind as indicated by the direction of the arrow of FIGS. 6 and 7. Simultaneously with this yawing of fuselage 22, the pilot also rotates the pilot's compartment 24 relative to fuselage 22 in the direction opposite the direction of yaw at a rate equal thereto. Since the stabilizer assembly 26 is rigidly interconnected with compartment 24, assembly 26 and compartment 24 maintain their original position with respect to the relative wind, as indicated by the arrow of FIGS. 6 and 7. In this high aspect ratio attitude, aircraft 21 may glide to a landing within a designated area. In order to increase the lift generated by fuselage 22 in its yawed attitude, gas is blown from slots 31 tangentially to the surface of fuselage 22 in the direction indicated by the small arrows, FIGS. 6 and 7, to induce circulation around the fuselage, thereby producing lift substantially in accordance with the well known Kutta-Joukowsky law.

Figure 8:
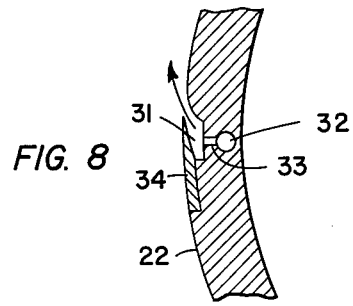
FIG. 8 is a schematic cross-sectional representation of a blowing cylinder lift augmentation device.

A blowing cylinder lift augmentation arrangement for use with fuselage 22 is schematically represented in cross-section in FIG. 8. Fuselage 22 is shown as a fairly thick curved plate, and slot 31 is formed in the outer surface thereof. A duct 32 is provided within element 22 and extends parallel to and somewhat spaced from slot 31. A plurality of ports 33 are provided between duct 32 and slot 31 at spaced intervals; the spacing therebetween, by way of example, generally being on the order of six to eight times the diameter of ports 33. One side wall of slot 31 is rounded, and a deflector element 34 extends from the other side wall of the slot and overlies a substantial portion of the width thereof. Element 34 has a sloping face adjacent the interior of slot 31; the direction of slope being tangential to and somewhat spaced from the rounded wall of the slot to define a flow channel. A gas introduced into conduit 32 will pass through ports 33 into slot 31 and thence through the flow channel between the rounded slot wall and element 34 to the exterior of element 22; the shape of the flow channel hereinbefore described being such that the gas will emerge from the flow channel in a direction substantially tangential to the surface of element 22. It will be noted that this arrangement is an oversimplification of an actual fuselage construction, and is intended to be merely illustrative of an operable slot arranged in combination with a suitable source of blowing gas.

An aerial or space vehicle 35 utilizing the variable aspect ratio concept is shown in FIGS. 9–11 of the drawings. Vehicle 35 includes an elongated fuselage or hull section 36 preferably elliptical in cross-section and tapering to some extent from its midpoint toward the ends thereof in cross-sectional area. A tip control panel 37 is mounted at each end of fuselage section 36 to rotate about an extension of the longitudinal axis thereof; the panels 37 forming extensions of section 36 and symmetrically tapering rather rapidly from base sections adjacent to and congruent with the ends of fuselage section 36 to a point on the longitudinal centerline extension. At the longitudinal midpoint of fuselage section 36 and on the longitudinal centerline thereof, a pair of rotatable mounts 38 are provided; one mount 38 being positioned on the upper surface and one mount 38 being positioned on the lower surface of section 36. The mounts 38 are mounted to rotate about a common axis, and a pylon 39 is connected to the outer surface of each mount 38 and projects outwardly therefrom. A reaction motor pod 41 is connected to the outer extremity of each pylon 39, and one or more motors 42 are mounted in each pod 41 in such a manner that the line of thrust of each motor 42 is spaced from and substantially parallel to the longitudinal axis of fuselage section 36 when the pods 41 are disposed in the position shown in FIGS. 9 and 10. Fuselage section 36 is also provided with yaw control jet devices, each having one or more nozzles 43, located on one side edge thereof adjacent each end thereof equidistant from the midpoint of fuselage section 36. Nozzles 43 are arranged to selectively direct jet blasts transversely with respect to the longitudinal axis of section 36 to create a yawing moment about the center of gravity of vehicle 35 to change the heading thereof with respect to its direction of movement. Fuselage section 36 is also provided with a pair of lift augmentation flap control devices 44 mounted to pivotally project from the side edge thereof opposite the edge provided with nozzles 43; there being one flap positioned near each end of section 36. Each flap 44 is normally positioned within section 36 in a recess provided therefor adjacent a slot in the edge of the section. The inner end of each flap is pivotally connected to the structure of section 36, and means are provided for swinging the outer end of each flap 44 from its recess to the position seen in FIG. 11. Vehicle 35 is also provided with suitable landing gear, not shown, as well as suitable conventional means such as directional jets, control surfaces, or the like, not shown, for assuring adequate pitch and roll control of vehicle 35.

At the commencement of a flight mission vehicle 35 is positioned for takeoff from the ground in the attitude shown in FIG. 11, with the longitudinal axis of fuselage section 36 positioned athwart the relative wind, the direction of which is indicated by the arrow. For takeoff, the tip panels 37 may also be deflected to provide a more efficient lifting arrangement. When vehicle 35 is airborne, flaps 44 are retracted, and the port yaw control jet device is operated to direct a blast from the nozzles 43 thereof to yaw the fuselage section 36. Simultaneously with the yawing of section 36, mounts 38 are rotated in the opposite direction at a substantially equal rate to maintain the heading of motors 42 into the relative wind. During the yawing of fuselage section 36, the tip panels 37 may be operated as ailerons for more positive turn and bank control. When vehicle 35 reaches the attitude shown in FIGS. 9 and 10, the aspect ratio of the vehicle has been drastically reduced, with a corresponding increase in performance capability at high speed. In the high speed flight attitude, the aftermost tip panel may be rotated 90 degrees with respect to fuselage section 36 to serve as a vertical stabilizer, as shown in FIG. 9. Upon completion of the flight mission, vehicle 35 is headed toward its landing area, the hereinbefore described yawing operation is performed in reverse, and the vehicle is landed in the high aspect ratio attitude in which takeoff was accomplished.

An aerial vehicle configuration suitable for use as a satellite or as a booster vehicle is shown in FIGS. 12a–12d. As a cylindrical satellite, generally designated by the reference numeral 45, the vehicle is sequentially illustrated in launch, orbit, reentry, and glide landing attitudes. Satellite 45 includes a cylindrical fuselage or hull section 46, which may contain liquid fuel storage means and instrumentation, and a stabilizer assembly including a motor section 47 of truncated conical form positioned adjacent one end thereof. The small end of motor section 47 is substantially equal in diameter to fuselage section 46, and is initially positioned in longitudinal alignment therewith but spaced a small distance therefrom. Flow conduit means of suitable design, not shown, are provided between the liquid fuel storage means of section 46 and one or more reaction type motors positioned within motor section 47. The flow conduit means are so designed that, upon the development of shearing movement between the juxtaposed circular faces of fuselage section 46 and motor section 47, shear separation or disconnection of the conduit means will occur at this point. The stabilizer assembly also includes a pair of boom members 48 rigidly connected to the conical surface of motor section 47 adjacent the periphery of the small end thereof at 180 degree intervals; the booms extending parallel to the axial centerline of sections 46 and 47 but spaced a distance slightly greater than the radius of section 46 therefrom. Booms 48 are somewhat greater in length than the distance from motor section 47 to the longitudinal midpoint of fuselage section 46, and are pivotally connected on a common axis to opposite sides of section 46 at the longitudinal midpoint thereof. It will now be apparent that section 46 may be rotated about the common axis between the pivotal connections thereof to booms 48, to move the longitudinal centerline of section 46 from its position parallel to booms 48 of the stabilizer assembly to a position substantially transverse thereto. The end of fuselage section 46 opposite the end thereof positioned adjacent motor section 47 is also provided with a jettisonable nose cone 49 which affords thermal protection for vehicle 45 during acceleration through the earth's atmosphere. Fuselage section 46 is also provided with yaw control jets 51 positioned adjacent each end thereof in a common radial location between, and spaced equidistantly from, the radial locations of the pivotal connections of booms 48 and section 46. These jets 51 are selectively operable to produce thrust in a direction transverse to the longitudinal axis of section 46 to create a yawing moment about the longitudinal midpoint thereof. Fuselage section 46 is also provided with a pair of flaps 52 of substantially rectangular, flat configuration retractable thereinto from an operative position in which the flaps project outwardly from the cylindrical surface of the section in a common plane which extends radially outwardly from the axial centerline thereof. Each flap 52 has a short edge positioned adjacent an end of section 46 and a second short edge positioned adjacent the longitudinal midpoint of section 46; the spacing between the two flaps 52 being somewhat greater than the width of a boom 48. The plane in which flaps 52 project from fuselage section 46 also preferably passes through one pivotal connection point between the fuselage section and a boom 48. The conical surface of motor section 47 is also provided with a control surface 53 extending between the ends of the section; each side edge of surface 53 lying in a plane radially extending from the axial centerline of the section The angle between the two planes defining the edges of surface 53 is preferably on the order of 45 degrees. The end edge of surface 53 adjacent the small end of section 47 is hingedly connected thereto adjacent the periphery of this small end, and means, not shown, are provided for swinging the other end edge of surface 53 away from section 47. Suitable quick release locking means of the electro-mechanical type may also be provided for maintaining fuselage section 46 and motor section in alignment when in an operative position, and which may be disengaged by means of an electrical signal to free sections 46 and 47 for relative movement. Means for activating yaw control jets 51, flaps 52, and control surface 53, and also for jettisoning nose cone 49, not shown, are also provided, and are designed also to operate in response to an electrical signal. The electrical signal for activating each of the hereinbefore mentioned electro-mechanical means may be programmed into equipment installed in vehicle 45, or may be transmitted from a ground transmiter to suitable receiving equipment carried in the vehicle. A pair of control surfaces, not shown, similar to control surface 53 and operable in like manner, may also be installed on motor section 47 at 90 degree intervals therefrom, for obtaining results more fully discussed hereinbelow.

The vehicle 45 is launched in the attitude shown in FIG. 12a with the sections 46 and 47 longitudinally aligned, nose cone 49 in place, and all control surfaces retracted. After the vehicle has left the atmosphere, or as it goes into orbit, the nose cone 49 is preferably jettioned. Upon the completion of its orbital mission, vehicle 45 is decelerated in any desirable manner, as by the firing of retro-rockets, to cause the vehicle 45 to begin descending toward the atmosphere. As the vehicle approaches the atmosphere, electrical signals are generated to release the connecting means provided between sections 46 and 47, and to activate one of the jets 51 to cause fuselage section 46 to yaw with respect to the stabilizer assembly, and substantially transverse to the direction of movement of vehicle 45. Vehicle 45 enters the atmosphere in this relatively high aspect ratio attitude. As vehicle 45 glides toward the ground for landing, flaps 52 are extended to generate lift over the cylindrical fuselage section 46, as shown in FIG. 12d, and control surface 53 is extended to increase the stability of vehicle 45 on its flight path, as shown. The hereinbefore mentioned additional control surfaces which may be provided on motor section 47 may be operated as elevators to control pitching movement of vehicle 45 as it is landed in the attitude shown in FIG. 12d.

The configuration of vehicle 45 is also believed to be particularly adapted for use as a recoverable rocket booster vehicle. When used for this purpose, the nose cone 49 of the vehicle 45 would be replaced by upper stage rocket vehicles, or by a powered payload, and no attempt would be made to place vehicle 45 itself into orbit. This vehicle would then be launched in the same manner as shown in FIG. 12a, and upon burnout of the motors in section 47 thereof, the second stage rocket or the powered payload would be launched from the upper end of fuselage section 46. The vehicle 45 would then be brought back through the atmosphere and to a glide landing as shown in FIGS. 12c and 12d, respectively, in the manner hereinbefore described.

It is to be understood that the lift means specifically provided for the fuselage 22, FIGS. 5–8, and the fuselage or hull section 46, FIG. 12d, are interchangeable in nature. The blowing slot lift generating means provided for fuselage 22 could be replaced by flaps such as the flaps 52 provided for fuselage section 46, while the flaps 52 provided for fuselage section 46 could be replaced by blowing slots such as the slots 31. It will also be apparent that the jet yaw control devices herein illustrated and described have been disclosed only by way of illustration, and not limitation, and that the invention contemplates the utilization of other suitable devices similarly operable and deemed well known in the art.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An aerial vehicle capable of powered movement through the atmosphere, comprising an elongated fuselage section, a stabilizer assembly pivotally connected to said fuselage section, means for yawing said fuselage section relative to said stabilizer assembly while in flight between a low aspect ratio position substantially in alignment with the direction of movement of said vehicle and a high aspect ratio position substantially transverse to said direction of movement, and means carried by said fuselage section operable for augmenting aerodynamic lift when said fuselage section is positioned substantially transverse to said direction of movement.

2. An aerial vehicle capable of movement through the atmosphere, comprising an elongated fuselage section, reaction propulsion means installed within said fuselage section, means for yawing said fuselage section while in flight between a low aspect ratio position substantially in alignment with the direction of movement of said vehicle and a high aspect ratio position substantially transverse to said direction of movement, a pilot's compartment rotatably mounted in said fuselage to rotate as a unit from an initial position in which the pilot faces the forward end of said fuselage through substantially a right angle, means operable for augmenting aerodynamic lift when said fuselage section is positioned substantially transverse to said direction of movement, and a stabilizer assembly including swept horizontally disposed lifting surfaces, said stabilizer assembly having a forward end rigidly connected to said pilot's compartment and being longitudinally disposed adjacent the upper surface of said fuselage section abaft said pilot's compartment when said compartment is in said initial position.

3. The aerial vehicle as defined in claim 2, wherein said lift augmenting means comprises at least one slot disposed on the surface of said fuselage section and extending substantially from end to end thereof, said slot being proportioned to discharge a flow of gas over the surface of said fuselage section substantially tangentially thereto for generating aerodynamic circulation.

4. An aerial vehicle capable of movement through the atmosphere, comprising an elongated cylindrical fuselage section, a stabilizer assembly including a pair of booms and a motor section, one end of each of said booms being rotatably connected to opposite sides of said fuselage section at the longitudinal midpoint thereof, said booms initially being positioned adjacent the cylindrical surface of said fuselage section substantially parallel to the longitudinal centerline thereof and extending toward one end thereof, said motor section initially positioned adjacent said end of said fuselage section, the other end of each of said booms being connected to said motor section, propulsion means within said motor section for initially generating thrust in a direction substantially aligned with the longitudinal centerline of said fuselage section, means for yawing said fuselage section while in flight between an initial low aspect ratio position wherein said fuselage section is longitudinally aligned with said direction of thrust about the axis between the pivotal connections of said booms to said fuselage section to a high aspect ratio position wherein the longitudinal centerline of said fuselage section is angularly positioned with respect to said direction of thrust of said propulsion means, and means operable for augmenting aerodynamic lift when said fuselage section is angularly positioned with respect to said direction of thrust.

5. The aerial vehicle as defined in claim 4, and including at least one vehicle stability control surface connected to said motor section.

6. The aerial vehicle as defined in claim 4, wherein said lift augmentation means comprises a pair of flaps retractably positioned within said fuselage section and operably radially extensible from the cylindrical surface thereof.

References Cited in the file of this patent

UNITED STATES PATENTS 2,720,271    Alex _____ Oct. 11, 1955